US012412096B2

(12) United States Patent
Ramachandran et al.

(10) Patent No.: US 12,412,096 B2
(45) Date of Patent: Sep. 9, 2025

(54) EFFICIENT WEIGHT CLIPPING FOR NEURAL NETWORKS

(71) Applicant: Advanced Micro Devices, Inc., Santa Clara, CA (US)

(72) Inventors: Arun Coimbatore Ramachandran, Bangalore (IN); Chandra Kumar Ramasamy, Bangalore (IN); Keerthan S. Shagrithaya, Bangalore (IN); Prakash Sathyanath Raghavendra, Bangalore (IN); Vasanthakumar Rajagopal, Bangalore (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 961 days.

(21) Appl. No.: 17/032,248

(22) Filed: Sep. 25, 2020

(65) Prior Publication Data

US 2021/0406690 A1    Dec. 30, 2021

Related U.S. Application Data

(60) Provisional application No. 63/044,610, filed on Jun. 26, 2020.

(51) Int. Cl.
*G06N 3/082* (2023.01)
*G06F 7/50* (2006.01)
(Continued)

(52) U.S. Cl.
CPC ............ *G06N 3/082* (2013.01); *G06F 7/50* (2013.01); *G06F 7/523* (2013.01); *G06F 7/535* (2013.01);
(Continued)

(58) Field of Classification Search
CPC ........ G06N 3/082; G06N 3/063; G06N 20/10; G06N 3/045; G06N 3/08; G06F 7/50;
(Continued)

(56) References Cited

U.S. PATENT DOCUMENTS

| | | | | |
|---|---|---|---|---|
| 5,058,034 A | * | 10/1991 | Murphy | G06F 7/00 706/41 |
| 6,192,360 B1 | * | 2/2001 | Dumais | G06F 16/353 2/5 |

(Continued)

OTHER PUBLICATIONS

Xu, Jiawei, et al. "A low-power arithmetic element for multi-base logarithmic computation on deep neural networks." 2018 31st IEEE International System-on-Chip Conference (SOCC). IEEE, 2018. (Year: 2018).*

(Continued)

*Primary Examiner* — Miranda M Huang
*Assistant Examiner* — Sidney Vincent Bostwick
(74) *Attorney, Agent, or Firm* — Kowert, Hood, Munyon, Rankin & Goetzel, P.C.; Rory D. Rankin

(57) ABSTRACT

Systems, apparatuses, and methods for implementing one-sided per-kernel clipping and weight transformation for neural networks are disclosed. Various parameters of a neural network are quantized from higher-bit representations to lower-bit representations to reduce memory utilization and power consumption. To exploit the effective range of quantized representations, positively biased weights are clipped and negated before convolution. Then, the results are rescaled back after convolution. A one-sided clipping technique is used for transforming weights to exploit the quantization range effectively, with the side chosen to be clipped being the biased side. This technique uses a global strategy for clipping without requiring skilled expertise. This approach allows the system to retain as much infor-
(Continued)

mation as possible without losing unnecessary accuracy when quantizing parameters from higher-bit representations to lower-bit representations.

20 Claims, 8 Drawing Sheets

(51) Int. Cl.
    *G06F 7/523*    (2006.01)
    *G06F 7/535*    (2006.01)
    *G06F 7/544*    (2006.01)
    *G06N 3/063*    (2023.01)
    *G06N 20/10*    (2019.01)

(52) U.S. Cl.
    CPC ........... *G06F 7/5443* (2013.01); *G06N 3/063* (2013.01); *G06N 20/10* (2019.01)

(58) Field of Classification Search
    CPC ........ G06F 7/523; G06F 7/535; G06F 7/5443; G06F 2207/4824; G06F 7/544
    See application file for complete search history.

(56) References Cited

U.S. PATENT DOCUMENTS

| | | | | |
|---|---|---|---|---|
| 2018/0225116 | A1* | 8/2018 | Henry | G06F 17/10 |
| 2019/0347550 | A1* | 11/2019 | Jung | G06N 3/08 |
| 2020/0134376 | A1* | 4/2020 | Sallee | G06N 3/084 |

OTHER PUBLICATIONS

Choukroun, Yoni, et al. "Low-bit quantization of neural networks for efficient inference." 2019 IEEE/CVF International Conference on Computer Vision Workshop (ICCVW). IEEE, 2019. (Year: 2019).*
Helwegen, Koen, et al. "Latent weights do not exist: Rethinking binarized neural network optimization." Advances in neural information processing systems 32 (2019). (Year: 2019).*
Thierens, Dirk. "Non-redundant genetic coding of neural networks." Proceedings of IEEE International Conference on Evolutionary Computation. IEEE, 1996. (Year: 1996).*
Courbariaux, et al., "BinaryConnect: Training Deep Neural Networks with Binary Weights During Propagations", 9 pages.
Jacob, et al., "Quantization and Training of Neural Networks for Effcient Integer-Arithmetic-Only Inference", Google Inc., Dec. 15, 2017, 14 pages.
Choi, et al., "PACT: Parameterized Clipping Activation for Quantized Neural Networks", IBM Research AI, Jul. 17, 2018, 15 pages.
Krishnamoorthi, "Quantizing Deep Convultional Networks for Effcient Inference: A Whitepaper", Jun. 21, 2018, 36 pages.
Zhao, et al., "Improving Neural Network Quantization without Retraining Using Outlier Channel Splitting", May 22, 2019, 10 pages.
Choukroun, et al., "Low-Bit Quantization of Neural Networks for Efficient Inference", Mar. 25, 2019, 10 pages.
Anonymous Authors, ACIQ: Analyiical Clipping for Integer Quantization of Neural Networks, 11 pages.
Migacz, "8-Bit Inference with TensorRT", NVIDIA, May 8, 2017, 41 pages.
Wu, "Low Precision Inference on GPU", NVIDIA, 60 pages.
Colbert et al., U.S. Appl. No. 18/065,393, entitled "Quantization—Aware Training With Numerical Overflow Avoidance for Neural Networks", filed Dec. 13, 2022, 45 pages.
International Search Report and Written Opinion of International Application No. PCT/S2024/033580, mailed Oct. 2, 2024, 12 pp.
Nilesh Prasad Pandey et al: "A Practical Mixed Precision Algorithm for Post-Training Quantization", arxiv.org, Cornell University Library, 201 Olin Library Cornell University Ithaca, NY 14853, Feb. 10, 2023 (Feb. 10, 2023), 10 pp.
Sangeetha Siddegowda et al: "Neural Network Quantization with AI Model Efficiency Toolkit (AIMET)", arxiv.org, Cornell University Library, 201 Olin Library Cornell University Ithaca, NY 14853, Jan. 20, 2022 (Jan. 20, 2022), 39 pp.

* cited by examiner

405 → _Weight Clipping_ :

*For each Kernel in layer:*

410 → *Outlier_max : maximum(kernelweights)*
415 → *Outlier_min : (absolute(minimum(kernelweights)))*

420 → *Scale_threshold: w1* Outlier_max+(1-w1)*Outlier_min*
425 → *Scale[kernel]: (kernelweights * num_bits) / Scale_threshold*

430 →         *if Outlier_max>Outlier_min :*
435 → *Scale[kernel]: negate(Scale[kernel])*

440 → *Kernelweights:round(Kernelweights / Scale[kernel])*

450 → _Quantization :_

455 → *Convolve_out = Convolve(inputs , Clipped_weights)*
460 → *Dequant       = (Convolve_out * Scale[:])/ num_bits*

*FIG. 4*

505 → kernelweights = { -20 , -10, -5, 5 , 12 , 15 , 25 }

Outlier_max = 25

Outlier_min = 20

510 → hyperparameter tunable w1= 0.5 , the value of w1 lies between [ 0 to 1 ]

515 → num_bits= 7  ( INT4 .  2^(4-1) -1 ) for 4-bit Integer

520 → Eg.  num_bits = 15 ( INT5 , 2 power ( 5 -1 ) – 1)

Step 1 :

525 → Scale_threshold = 0.5*25  + (1-0.5)*20 = 20 + 4 = 22.5   [ one side clipping ]

Step 2 :

530 → Scale_factors(kernel) =  { -20*7/22.5, -10*7/22.5 , ...25*7/22.5 }

535 → = { -6.22,3.11 ... 7.77 }

Step 3: Negate

540 → Scale(kernel ) = { 6.22.-3.11 ... -7.77} ( since Outlier_max > Outlier_min )

[ Efficiently using the additional bits ]

Quantize:

545 → Round(scale(kernel)) = { 6 , -3 ... -8 }

Now all the values are in the range { -8,  7 }  - [ INT4 Range ]

Step 4 :

550 → Use quantized weights for convolution

Step 5 :

555 → Post convolution rescale to floating point.

*FIG. 5*

EFFICIENT WEIGHT CLIPPING FOR NEURAL NETWORKS

CROSS REFERENCE TO RELATED APPLICATIONS

This application claims priority to Provisional Patent Application Ser. No. 63/044,610, entitled "EFFICIENT WEIGHT CLIPPING FOR NEURAL NETWORKS", filed Jun. 26, 2020, the entirety of which is incorporated herein by reference.

BACKGROUND

Description of the Related Art

An emerging technology field is machine learning, with a neural network being one type of a machine learning model. Implementing neural networks on graphics processing units (GPUs) or other parallel processing units (e.g., digital signal processors (DSPs), field programmable gate arrays (FPGAs), application specific integrated circuits (ASICs)) involves loading and processing large amounts of data. Neural networks have demonstrated excellent performance at tasks such as hand-written digit classification and face detection. Additionally, neural networks have also shown promise for performing well in other, more challenging, visual classification tasks. Other applications for neural networks include speech recognition, language modeling, sentiment analysis, text prediction, and others. However, neural networks often use significant amounts of processing and memory resources.

A convolutional neural network typically includes many layers such as convolution layers, pooling layers, normalization layers, and so on. A convolution layer uses one or more convolution kernels to filter an input dataset (e.g., an image). As used herein, a "kernel" is defined as a plurality of values used for filtering input data. Each kernel is typically a matrix of values. The kernel is used for blurring, sharpening, embossing, edge detection, and more. It is noted that a "kernel" can also be referred to as a "filter", "convolution filter", or "channel". The convolution layer performs a convolution between one or more kernels and the input dataset.

The computation and memory requirements of implementing convolutional neural networks implementations are increasing at a rapid pace. One technique for reducing the implementation complexity of a convolutional neural network involves quantizing various floating-point parameters and data values into low-precision fixed-point numbers. This quantization helps to reduce the model size as well as the complexity of single precision floating point multiply-accumulate operations. For example, one type of a low-precision fixed-point number representation is the integer 4 (or INT4) representation. The INT4 data type includes 4 bits to represent an integer value from −8 to 7. Since the range of the INT4 data type is from −8 to 7, the range is negatively biased. However, many kernels have weights that are positively biased. As used herein, a kernel is defined as "positively biased" if the maximum weight of the kernel is greater than the absolute value of the minimum weight of the kernel. Quantizing positively biased kernels into a limited precision representation like INT4 results in an inefficient usage of the available range.

BRIEF DESCRIPTION OF THE DRAWINGS

The advantages of the methods and mechanisms described herein may be better understood by referring to the following description in conjunction with the accompanying drawings, in which:

FIG. 4 illustrates one example of pseudo-code for performing weight transformation and clipping in accordance with one implementation.

FIG. 5 illustrates one example of performing one-sided clipping and quantization for a set of kernel weights in accordance with one implementation.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing efficient per kernel clipping of neural network data values are disclosed herein. In one implementation, a system includes at least a processor and a memory storing parameters (e.g., input datasets, activation data, weights) for various layers of a neural network. In one implementation, the processor uses a global, per-kernel strategy of adjusting the quantization bias of parameters followed by one-sided clipping. This approach allows the processor to retain as much information as possible without losing unnecessary accuracy when quantizing parameters from higher-bit representations to lower-bit representations.

In one implementation, one-sided clipping is performed to reduce values to a threshold on one side of the value distribution. With clipping, outliers are reduced to a threshold value. In other words, any value above a saturation threshold is limited to the threshold. After clipping, quantization is performed on the post-clipped values. In one implementation, if the weights of a kernel are positively biased and the quantized representation (e.g., INT4) is negatively biased, then the weights are negated prior to being quantized. This helps to more effectively use the available range of the quantized representation.

Figure 1:
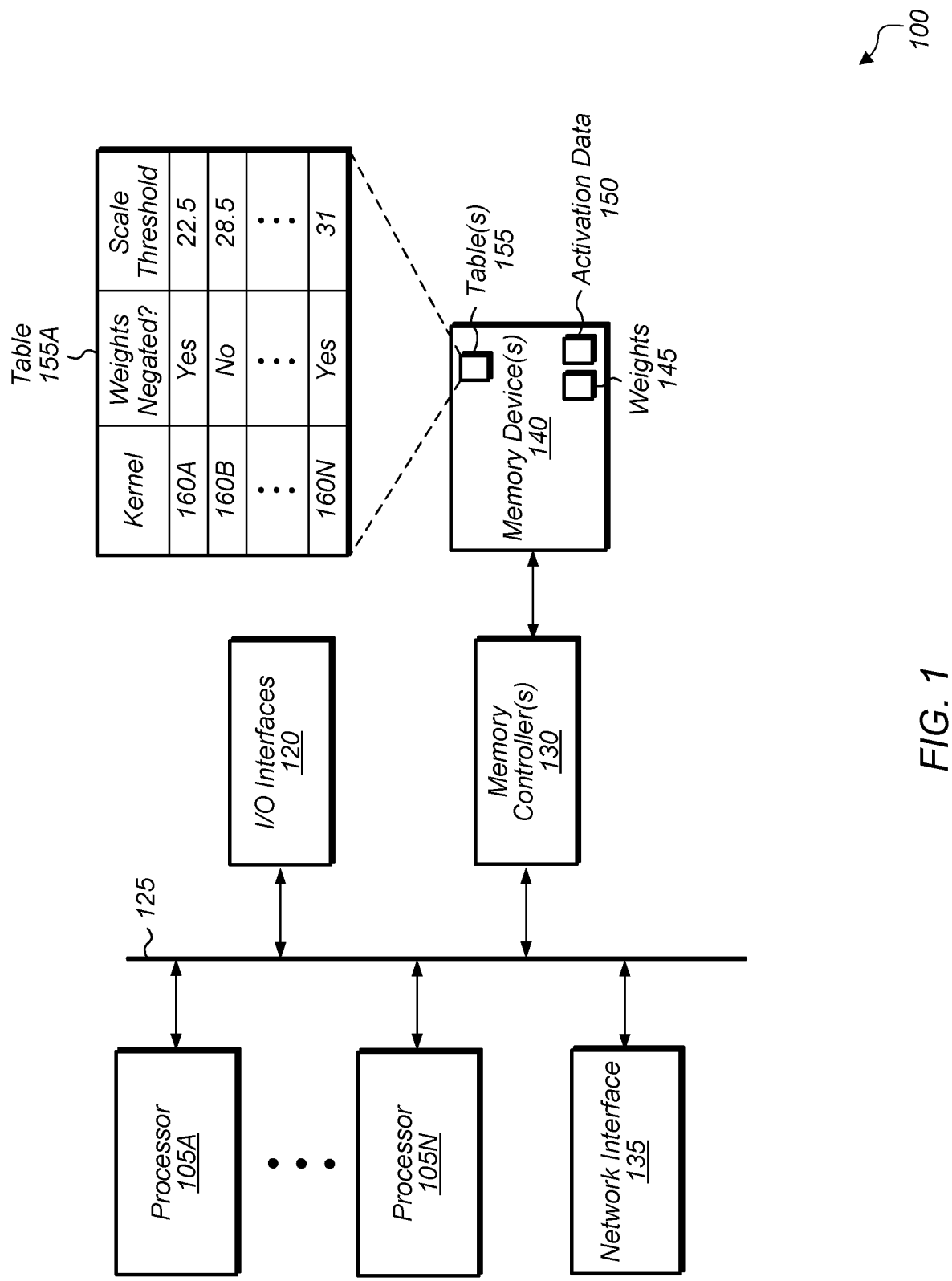
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, and memory device(s) 140. In other implementations, computing system 100 includes other components, omits one or more of the illustrated components, and/or computing system 100 is arranged differently. Processors 105A-N are representative of any number of processing units which are included in system 100.

In one implementation, processor 105A is a general purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors.

Memory controller(s) 130 are representative of any number and type of memory controllers accessible by processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others. In one implementation, memory device(s) 140 store weights 145 and activation data 150 of a neural network.

In one implementation, weights 145 are quantized from a relatively high-precision data type representation to a relatively low-precision data type representation so as to reduce the memory required for storage and to reduce the power consumed by system 100 when implementing the neural network. In another implementation, activation data 150 is quantized from a relatively high-precision data type representation to a relatively low-precision data type representation. In a further implementation, weights 145 and activation data 150 are quantized from relatively high-precision data type representations to relatively low-precision data type representation. In one implementation, the quantization is performed ahead of time before implementation of the neural network. In some implementations, a first computing system performs the quantization of the various neural network parameters and then a second computing system executes the neural network with the quantized parameters. In another implementation, at least a portion of the quantization is performed at run-time as the neural network is being executed.

In one implementation, memory device(s) 140 store table(s) 155 for recording how the weights of each kernel 160A-N were quantized. The information stored in table(s) 155 is retrieved during descaling and dequantization to reverse the scaling and quantization process. As shown in the expanded box above table(s) 155, table 155A includes data specifying how each kernel 160A-N was quantized. Since different kernels 160A-N can be quantized differently, the results of convolution will be dequantized differently depending on how the kernel was quantized. For example, the weights of kernel 160A were negated as indicated in the first row of table 155A. In one implementation, this means that the weights of kernel 160A were positively biased. Accordingly, after convolution is performed between the weights of kernel 160A and the corresponding portion of activation data 150, the results of convolution for kernel 160A will be negated. Also, the scale threshold of 22.5 is specified for kernel 160A, so when the results of convolution for kernel 160A are descaled, the results will be descaled using scale threshold 22.5.

As used herein, the term "negate" is defined as multiplying a value by negative one. For example, if the original weights for a kernel are {5, −3, 7}, then the results of negating the original weights of the kernel would be the following: 5 would become −5, −3 would become 3, and 7 would become −7. In other words, the negated weights in this example would be {−5, 3, −7}.

Similarly, the results of convolution for kernel 160B will be descaled using the scale threshold of 28.5 as specified in the second row of table 155A. However, since the "weights negated" column of the entry for kernel 160B specifies "No", the results of convolution for kernel 160B will not be negated. In one implementation, the "weights negated" column of the entry for kernel 160B specifying "No" is due to the weights of kernel 160B being negatively biased. The results of convolution for the other kernels will be dequantized and descaled according to the data stored in their corresponding entries of table(s) 155. It should be understood that the example table 155A for kernels 160A-N is merely indicative of one particular implementation. In other implementations, table(s) 155 can include other information and/or table(s) 155 can be structured in other suitable manners. Also, although not shown in FIG. 1, in further implementations, table(s) 155 include entries specifying how activation data 150 was quantized.

It is noted that some hardware implementations may not use table(s) 155. For example, in one implementation, one or more processor(s) 105A-N may include dedicated logic units for performing a specific type of dequantization and descaling after performing convolution with negated weights. In this implementation, when the weights of a kernel are negated during quantization, the hardware routes the weights to a dedicated logic unit that automatically negates the results of convolution. Accordingly, in this implementation, the hardware does not store an indication that the weights of a given kernel were negated since the logic unit to which the weights of the given kernel are routed is based on whether the weights were negated or not.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
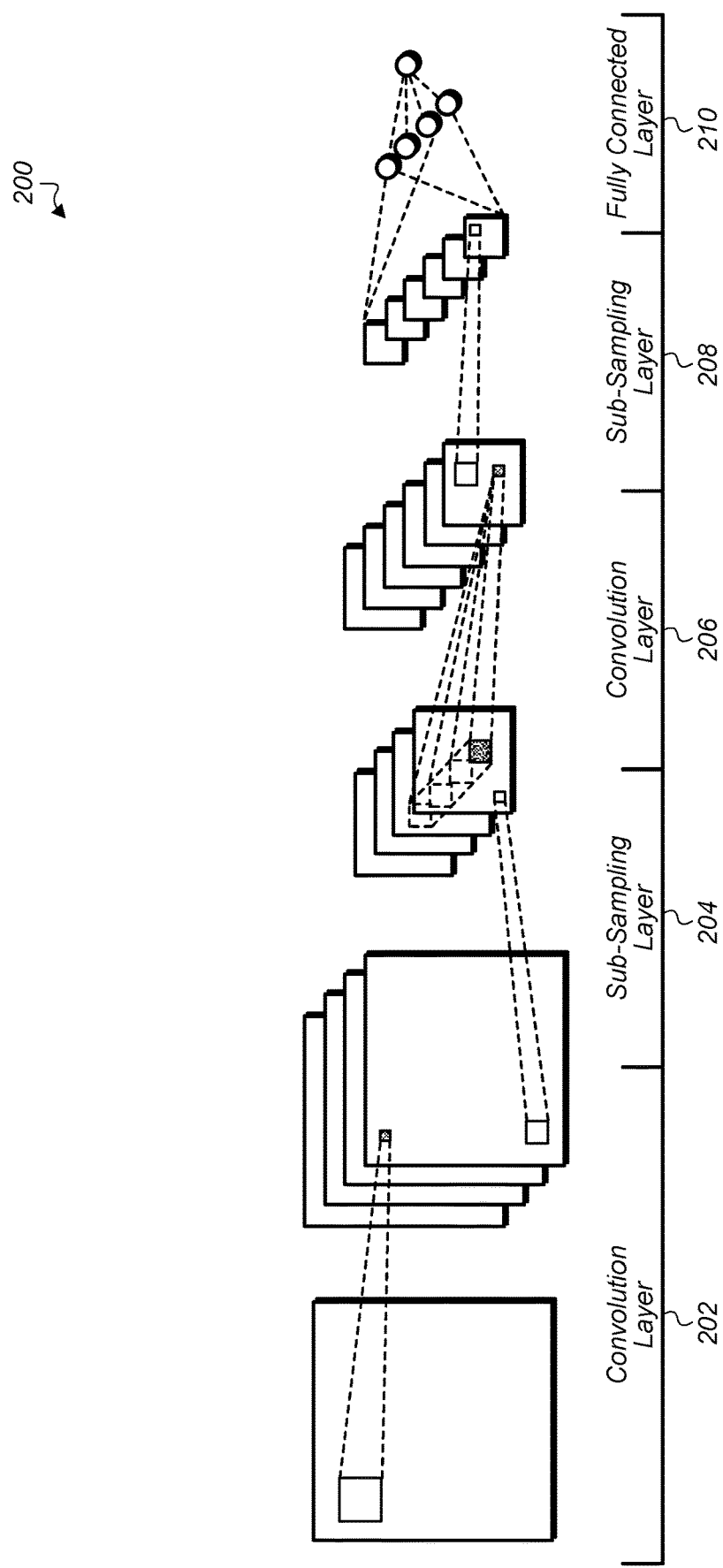
FIG. 2 is a block diagram of one implementation of a neural network.

Turning now to FIG. 2, a block diagram of one implementation of a neural network 200 is shown. Neural network 200 includes convolution layer 202, sub-sampling layer 204, convolution layer 206, sub-sampling layer 208, and fully connected layer 210. In other implementations, neural network 200 can include other numbers and arrangements of layers. When implementing neural network 200 on a computing system (e.g., system 100 of FIG. 1), the storage requirements and power consumption of the system can be reduced by quantizing a portion or the entirety of the data values being processed during the implementation of neural network 200. Accordingly, in one implementation, the system quantizes at least a portion of the data values in an intelligent manner without losing unnecessary accuracy.

Figure 3:
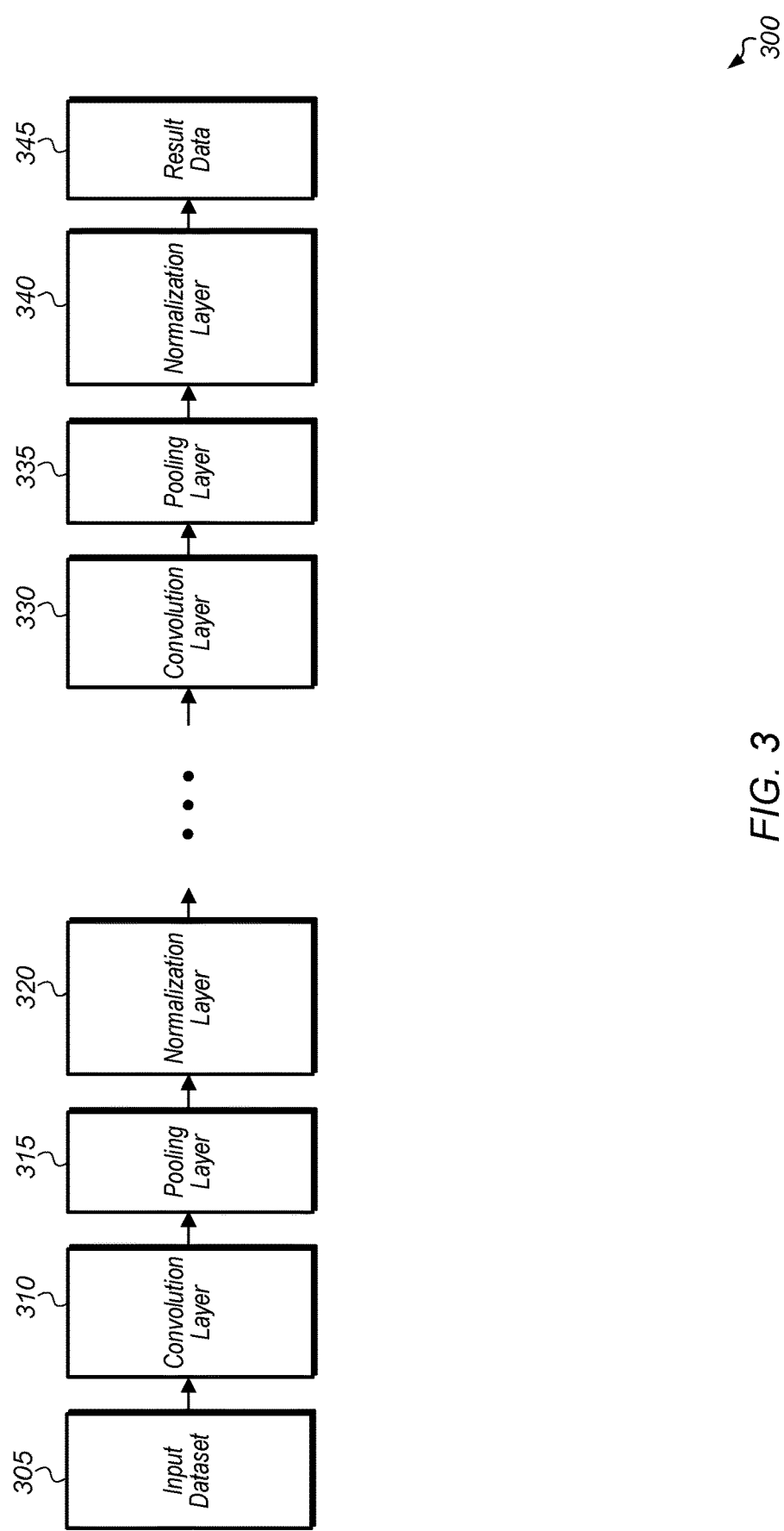
FIG. 3 is a block diagram of one implementation of a neural network.

Referring now to FIG. 3, a block diagram of another implementation of a neural network 300 is shown. Neural network 300 illustrates another example of a neural network that can be implemented on a computing system (e.g., system 100 of FIG. 1). Neural network 300 includes at least convolution layer 310, pooling layer 315, normalization layer 320, convolution layer 330, pooling layer 335, normalization layer 340, and any number of other layers. Neural network 300 processes group of input dataset 305 to generate result data 345. In one implementation, input dataset 305 is an image. In other implementations, input dataset 305 includes any of various other types of data.

Turning now to FIG. 4, one example of pseudo-code 400 for performing weight transformation and clipping in accordance with one implementation is shown. Weight clipping section 405 of pseudo-code 400 is shown at the top of FIG. 4. For each kernel in the layer, step 410 involves determining the maximum outlier value in the kernel. The variable "outlier_max" stores the maximum outlier value in the kernel. Next, in step 415, the minimum outlier value in the kernel is determined, and then the variable "outlier_min" stores the absolute value of the minimum outlier value. For example, if the minimum outlier value is −56, then the variable "outlier_min" will be equal to 56.

Then, in step 420, a hyperscale parameter "w1" is multiplied by the variable "outlier_max" and added to the result of 1−"w1" multiplied by "outlier_min". In other words, the product of "w1" multiplied by "outlier_min" is added to the product of "w1" subtracted from 1 and "outlier_min". The output of step 420 is stored to the variable "scale threshold". The variable "scale threshold" stores the amount that each weight in the kernel will be scaled as shown in step 425. In step 425, a scale value is generated by multiplying each weight in the kernel by the maximum positive value in the data type representation which is then divided by the variable "scale threshold". In other words, each weight is scaled by a scaling threshold determined by the maximum outlier of the kernel weights and the absolute value of the minimum outlier of the kernel weights. The exact point at which the value falls within the range is determined by the hyper-parameter "w1". In one implementation, multiple iterations are run to find a desirable value of the hyper-parameter "w1".

In step 430, the processor determines if the variable outlier_max is greater than the variable outlier_min. In other words, the processor determines if the maximum weight in the kernel is greater than the absolute value of the minimum weight in the kernel. If the variable outlier_max is greater than the variable outlier_min, then in step 435, the weights of the kernel are negated (i.e., inverted). Next, in step 440, the kernel weights are rounded to the discrete levels of the quantized representation. For example, for the INT4 representation, the kernel weights are rounded to the integer values in the range from −8 to 7.

During the quantization phase 450, the quantized weights are used to perform a convolution in step 455 with the corresponding activation data. Once the processing results of the convolution have been obtained, the processing results are dequantized, descaled, and optionally negated in step 460. It is noted that the steps indicated by pseudo-code 400 can be repeated for each kernel of the given layer of the neural network.

Referring now to FIG. 5, one example 500 of performing one-sided clipping and quantization for a set of kernel weights is shown. As shown in section 505, the kernel weights are {−20, −10, −5, 5, 12, 15, 25} for the specific example 500 illustrated in FIG. 5. Accordingly, for this set of kernel weights, the outlier maximum is 25 and the outlier minimum is −20. These weights are considered to be positively biased since the outlier maximum (25) is greater than the absolute value (20) of the outlier minimum. The hyperparameter tunable w1 is specified as 0.5 for this example. It should be understood that in other scenarios, the hyperparameter tunable w1 can be set to other values. As used herein, a "hyperparameter" is a value that may be used to override or otherwise alter initial or default values. In various implementations, these hyperparameters may be directly determined and stored by a programmer for access by an application. In other implementations, such values may be modified at initialization time or calculated upon initialization of an application based on previously stored values. These and other implementations are possible and are contemplated.

Next, the number bit range (or num_bit_range) is specified as 7 for the INT4 representation, as shown in section 515. The number bit range can also be referred to as the highest positive number that can be represented by the quantized format. For other implementations, with other quantized representations, other number bit range values can be specified. For example, in another implementation, the number bit range would be 15 for the INT5 representation as shown in section 520.

Next, the steps 1-5 are specified for performing the one-sided clipping and quantization. In step 1, the scale threshold value is calculated using the formula specified by section 525. The original scale threshold formula is also shown in step 520 (of FIG. 5). For the example kernel weights shown in section 505, the scale threshold is equal to the outlier maximum multiplied by the hyperparameter tunable added to the product obtained by multiplying the difference between 1 and the hyperparameter tunable by the absolute value of the outlier minimum. For the specific values of the kernel weights specified in section 505, the scale threshold is equal to 22.5. Next, in step 2, the scale factors are calculated for the kernel weights, with each weight multiplied by the number bit range value and divided by the scale threshold. How the scale factor values are being calculated is shown in section 530 for the first, second, and last kernel weights. Section 535 shows the final scale factor values based on the calculations of section 530 for the first, second, and last kernel weights.

Step 3 involves negating the scale factors since the kernel weights are positively biased (i.e., outlier maximum>abs (outlier minimum)). Section 540 shows the negated kernel weights for the first, third, and last values. Next, the negated kernel weights are rounded to the actual quantization levels able to be represented by the final quantized format. After rounding, the first, second, and last quantized kernel weights are {6, −3, and −8}. Next, in step 4, the quantized weights are used for performing convolution as indicated in section 550. Then, in step 5, the results of the convolution are rescaled to the floating point representation in section 555. It is noted that the above steps are indicative of one particular implementation. It should be understood that variations to the above steps are possible and are contemplated.

Figure 6:
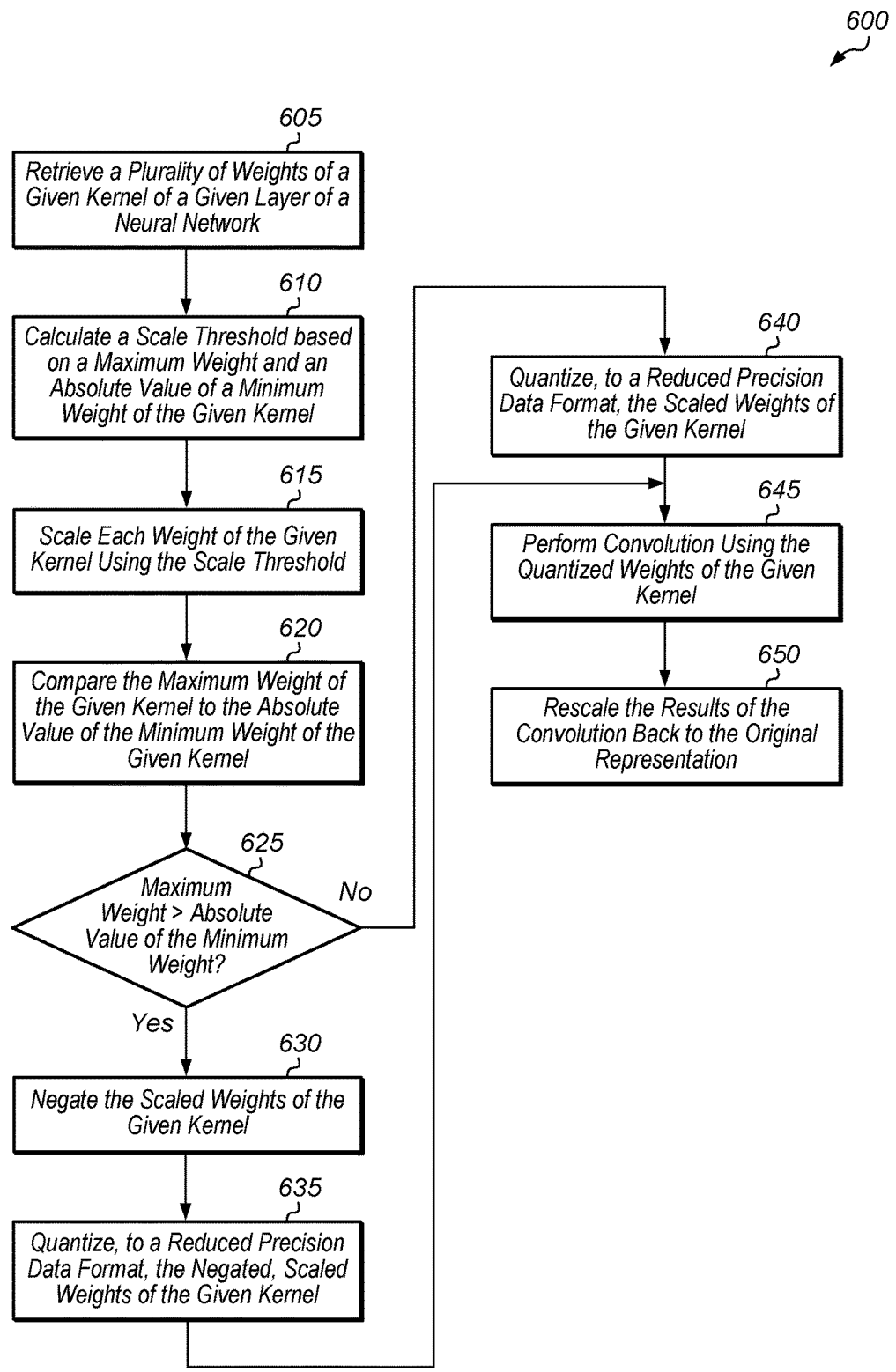
FIG. 6 is a generalized flow diagram illustrating one implementation of a method for implementing per kernel weight transformation for a neural network.
Figure 7:
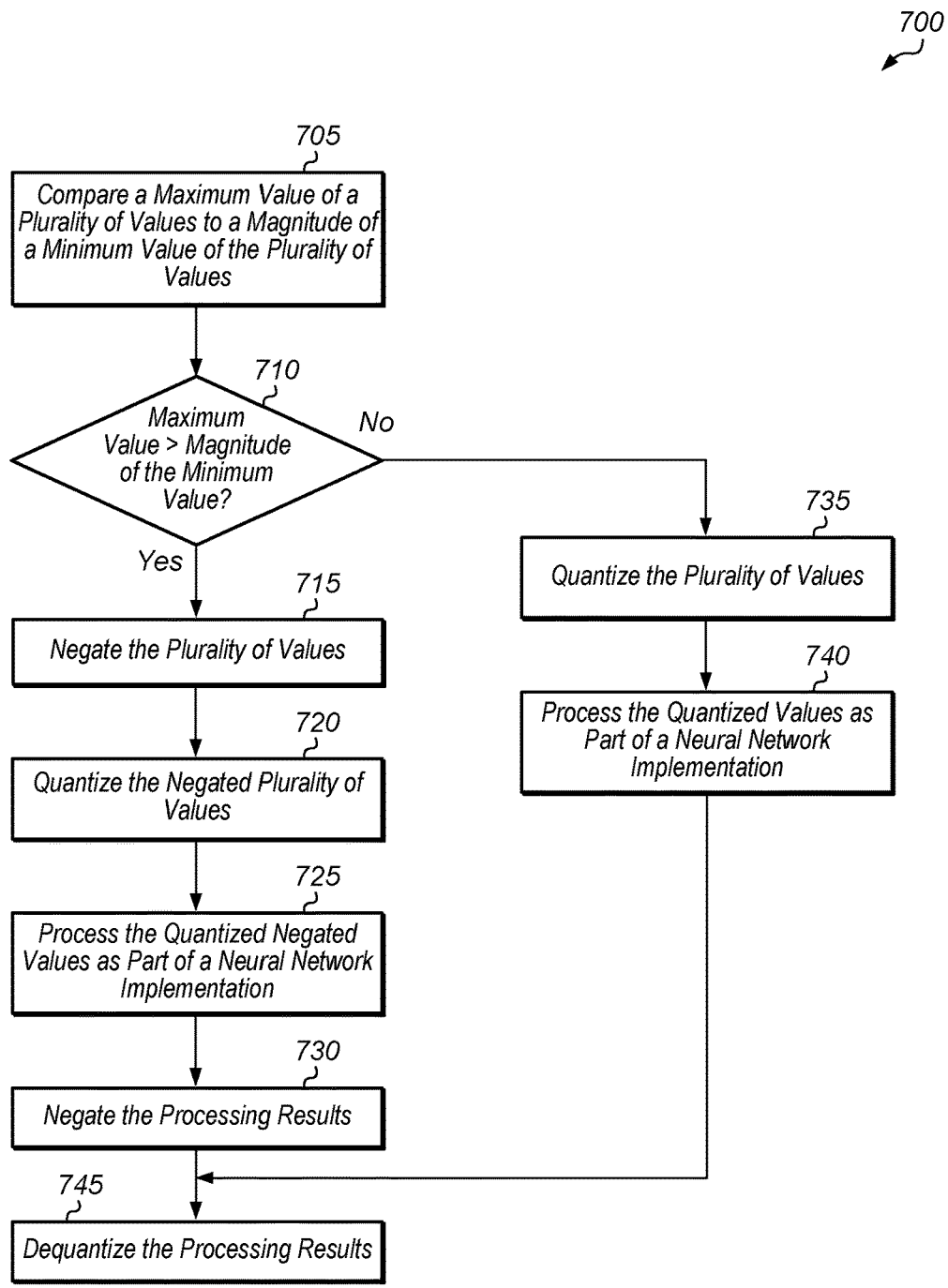
FIG. 7 is a generalized flow diagram illustrating one implementation of a method for quantizing parameters of a neural network.
Figure 8:
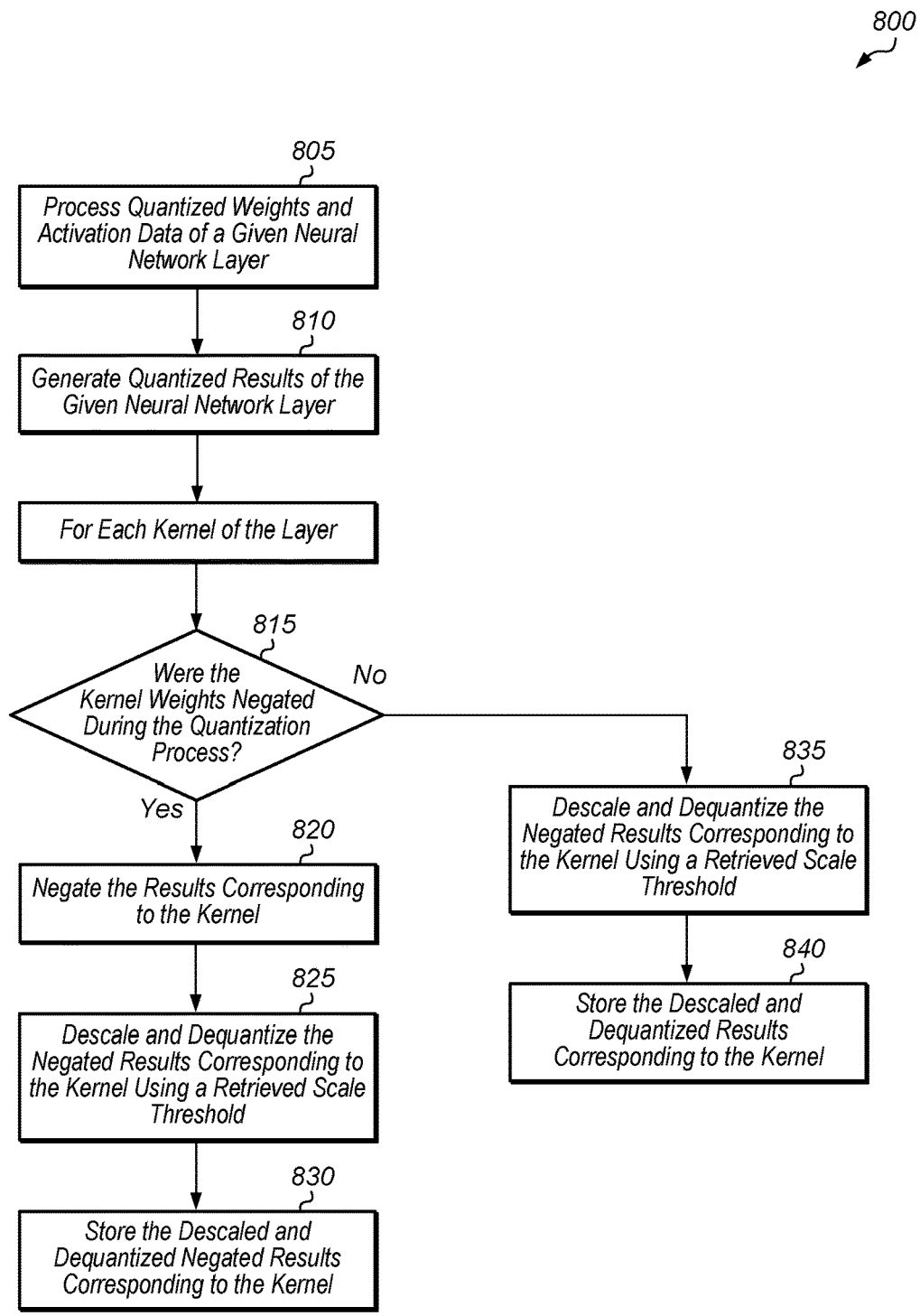
FIG. 8 is a generalized flow diagram illustrating one implementation of a method for descaling and dequantizing the results of a given neural network layer.

Turning now to FIG. 6, one implementation of a method 600 for implementing per kernel weight transformation for a neural network is shown. For purposes of discussion, the steps in this implementation those of FIG. 7-8 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 600.

A processing unit retrieves a plurality of weights of a given kernel of a given layer of a neural network (block 605). In one implementation, the given kernel is a convolution filter of a convolutional layer. It is noted that the processing unit can be any type of processing unit (e.g., CPU, GPU, DSP, FPGA, ASIC), with the type varying according to the implementation. In other words, the processing unit can be a dedicated processing unit (e.g., CPU, GPU, DSP) or the processing unit can be implemented using control logic (e.g., FPGA, ASIC).

Next, the processing unit calculates a scale threshold based on a maximum weight and an absolute value of a minimum weight of the given kernel (block 610). In one implementation, the scale threshold is calculated using the equation shown in step 420 of FIG. 4. Then, the processing unit scales each weight of the given kernel using the scale threshold (block 615). In one implementation, the each weight is scaled with the scale threshold using the equation shown in step 425 of FIG. 4. The combination of blocks 610 and 615 can also be referred to as performing one-sided clipping.

Also, the processing unit compares the maximum weight of the given kernel to the absolute value of the minimum weight of the given kernel (block 620). In other words, in block 620, the processing unit determines if the weights of the kernel are negatively biased, positively biased, or symmetric. As used herein, the weights of a kernel are "positively biased" if the maximum weight is greater than the absolute value of the minimum weight. Also, as used herein, the weights of a kernel are "negatively biased" if the absolute value of the minimum weight is greater than the maximum weight. Still further, as used herein, the weights of a kernel are "symmetric" if the maximum weight is equal to the absolute value of the minimum weight.

Next, if the maximum weight of the given kernel is greater than the absolute value of the minimum weight of the given kernel (conditional block 625, "yes" leg), then the processing unit negates the scaled weights of the given kernel (block 630). In other words, the processing unit multiplies each scaled weight of the given kernel by −1. Next, the processing unit quantizes, to a reduced precision data format, the negated, scaled weights of the given kernel (block 635). In one implementation, the quantization range is negatively biased from "−K−1" to "K", where the value of "K" is equal to $2^{N-1}-1$, and where "N" is the number of bits of the quantized representation. For example, for the INT4 data type, the quantization range is (−8,7). In this implementation, negating the positively biased scaled weights helps to more efficiently utilize the negatively biased quantization range.

If the maximum weight of the given kernel is less than or equal to the absolute value of the minimum weight of the given kernel (conditional block 625, "no" leg), then the processing unit quantizes, to a reduced precision data format, the scaled weights of the given kernel (block 640). Then, the processing unit performs convolution using the quantized weights of the given kernel (block 645). After, performing convolution using the quantized weights of the given kernel, the results of the convolution are rescaled back to the original representation (e.g., floating point representation) (block 650). For example, if the weights were negated, then the results of the convolution will be negated while also having the scaling reversed to return back to the original representation. In other words, the decoding process (i.e., dequantization process) after convolution will reverse the steps that were performed during the encoding process (i.e., quantization process). After block 650, method 600 ends. It is noted that method 600 can be repeated for each kernel of the given layer. Method 600 can also be repeated for each convolutional layer in the neural network. In one implementation, the neural network is executed to process an input dataset so as to generate a classification of the input dataset (e.g., image). In other implementations, the neural network is executed to generate other outcomes.

Referring now to FIG. 7, one implementation of a method 700 for quantizing parameters of a neural network is shown. A processing unit compares a maximum value of a plurality of values to a magnitude of a minimum value of the plurality of values (block 705). It is noted that the "plurality of values" can also be referred to as a "dataset". In one implementation, the plurality of values are the weights of a given kernel. In another implementation, the plurality of values are the activation data values for a given layer. In other implementation, the plurality of values are other types of data generated by or representative of some portion of a neural network.

Next, if the maximum value is greater than the magnitude of the minimum value (conditional block 710, "yes" leg), then the processing unit negates the plurality of values (block 715). Next, the processing unit quantizes the negated plurality of values (block 720). It is noted that in some implementations, the processing unit scales the plurality of values prior to quantizing. Then, the processing unit processes the quantized negated values as part of a neural network implementation (block 725). In some cases, the neural network implementation is a trained neural network. In other cases, block 725 is performed during the training of a neural network. Next, the processing unit negates the processing results (block 730). Then, the processing unit dequantizes the processing results (block 745). After block 745, method 700 ends.

If the maximum value is less than or equal to the magnitude of the minimum value (conditional block 710, "no" leg), then the processing unit quantizes the plurality of values (block 735). Next, the processing unit processes the quantized values as part of a neural network implementation (block 740). Then, the processing unit dequantizes the processing results (block 745). By performing method 700, the memory requirements and power consumption are reduced during the processing of the plurality of values by the neural network.

Turning now to FIG. 8, one implementation of a method 800 for descaling and dequantizing the results of a given neural network layer is shown. A processing unit processes quantized weights and activation data of a given neural network layer (block 805). During processing, the processing unit generates quantized results of the given neural network layer (block 810). Next, prior to descaling and dequantizing the results of the given neural network layer, the processing unit determines, for each kernel of the given neural network layer, if the kernel weights were negated during the quantization process (conditional block 815). In one implementation, the processing unit retrieves stored indications and/or stored scale thresholds associated with the kernels of the given neural network layer, with the stored indications specifying which kernels were negated during the quantization process and the scale threshold values specifying how each kernel was scaled during the quantization process. In another implementation, a signal is passed along with the weights during processing of the given neural network layer to indicate that the weights were negated.

For the results corresponding to each kernel of the given neural network, if the original kernel weights were negated during the quantization process (conditional block 815, "yes" leg), then the processing unit negates the results corresponding to the kernel (block 820). Next, the processing unit descales and dequantizes the negated results corresponding to the kernel using a retrieved scale threshold (block 825). Then, the processing unit stores the descaled and dequantized negated results (block 830). The descaled and dequantized negated results can then by processed by a subsequent layer of the neural network.

Otherwise, if the weights for the kernel were not negated during the quantization process (conditional block 815, "no" leg), then the processing unit descales and dequantizes the results corresponding to the kernel using the retrieved scale threshold (block 835). Then, the processing unit stores the descaled and dequantized results (block 840). The descaled and dequantized negated results can then by processed by a subsequent layer of the neural network.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   a processing circuit, wherein the processing circuit is configured to:
   receive a plurality of weights of a given kernel corresponding to a layer of a neural network comprising a plurality of layers, each of the plurality of weights comprising a signed value; and
   generate a classification of an input dataset with the neural network, wherein to generate the classification, the processing circuit is configured to:
   negate each weight of the plurality of weights, responsive to a maximum weight of the plurality of weights of the given kernel being greater than an absolute value of a minimum weight of the plurality of weights of the given kernel;
   quantize the negated weights to generate quantized versions of the plurality of weights; and
   execute, using the generated quantized versions of the plurality of weights, the layer of the neural network to generate an output based on the input dataset.

2. The system as recited in claim 1, wherein the processing circuit is further configured to perform one-sided clipping of the plurality of weights prior to negating the plurality of weights, and wherein quantizing negated weights comprises rounding to a nearest quantization level of a reduced precision data format.

3. The system as recited in claim 2, wherein performing one-sided clipping of the plurality of weights comprises:
   calculating a scale threshold based on the maximum weight and the absolute value of a minimum weight of the given kernel; and
   scaling each weight of the plurality of weights using the scale threshold.

4. The system as recited in claim 3, wherein calculating the scale threshold comprises:
   multiplying a tunable parameter by the maximum weight to generate a first product;
   subtracting the tunable parameter from one to generate a difference value;
   multiplying the difference value by the absolute value of the minimum weight to generate a second product; and
   adding the first product to the second product.

5. The system as recited in claim 3, wherein each weight is multiplied by a maximum positive value of a range of the reduced precision data format, and wherein each weight is divided by the scale threshold.

6. The system as recited in claim 3, wherein the processing circuit is further configured to perform convolution between activation data and negated scaled versions of the plurality of weights, wherein negated scaled versions of the plurality of weights are quantized to an integer 4 (INT4) representation with a range of −8 to 7.

7. The system as recited in claim 1, further comprising:
   a memory storing the plurality of weights of a plurality of kernels of the plurality of layers of the neural network; and
   wherein for each kernel of the plurality of kernels of the plurality of layers of the neural network, the processing circuit is configured to:
   compare a maximum weight of the kernel to an absolute value of a minimum weight of the kernel;
   responsive to determining that the maximum weight of the kernel is greater than the absolute value of the minimum weight of the kernel:

negate each weight of the plurality of weights of the kernel;
quantize, to a reduced precision data format, the negated weights of the kernel; and
perform convolution using quantized negated versions of the plurality of weights of the kernel.

8. A method comprising:
receiving, by a processing circuit, a plurality of weights of a given kernel corresponding to a layer of a neural network comprising a plurality of layers, each of the plurality of weights comprising a signed value; and
generating, by the processing circuit, a classification of an input dataset with the neural network, wherein generating the classification comprises:
negating, by the processing circuit, each weight of the plurality of weights, responsive to a maximum weight of the plurality of weights of the given kernel being greater than an absolute value of a minimum weight of the plurality of weights of the given kernel;
quantizing, by the processing circuit, the negated weights to generate quantized versions of the plurality of weights; and
executing, by the processing circuit using the generated quantized versions of the plurality of weights, the layer of the neural network to generate an output based on the input dataset.

9. The method as recited in claim 8, further comprising performing, by the processing circuit, one-sided clipping of the plurality of weights prior to negating the plurality of weights, and wherein quantizing negated weights comprises rounding to a nearest quantization level of a reduced precision data format.

10. The method as recited in claim 9, wherein performing one-sided clipping of the plurality of weights comprises:
calculating, by the processing circuit, a scale threshold based on the maximum weight and the absolute value of a minimum weight of the given kernel; and
scaling, by the processing circuit, each weight of the plurality of weights using the scale threshold.

11. The method as recited in claim 10, wherein calculating the scale threshold comprises performing, by the processing circuit, one or more operations, at least including:
multiplying a tunable parameter by the maximum weight to generate a first product;
subtracting the tunable parameter from one to generate a difference value;
multiplying the difference value by the absolute value of the minimum weight to generate a second product; and
adding the first product to the second product.

12. The method as recited in claim 10, wherein each weight is multiplied by a maximum positive value of a range of a reduced precision data format, and wherein each weight is divided by the scale threshold.

13. The method as recited in claim 10, further comprising performing, by the processing circuit, convolution between activation data and negated scaled versions of the plurality of weights, and wherein the negated scaled versions of the plurality of weights are quantized to an integer 4 (INT4) representation with a range of −8 to 7.

14. The method as recited in claim 8, wherein for each kernel of a plurality of kernels of a plurality of layers of a neural network, the method further comprising:
comparing, by the processing circuit, a maximum weight of the kernel to an absolute value of a minimum weight of the kernel;
responsive to determining that the maximum weight of the kernel is greater than the absolute value of the minimum weight of the kernel:
negating, by the processing circuit, each weight of the plurality of weights of the kernel;
quantizing, by the processing circuit, negated versions of the plurality of weights of the kernel; and
performing, by the processing circuit, a convolution operation using quantized negated versions of the plurality of weights of the kernel.

15. An apparatus comprising:
a memory comprising circuitry configured to store a plurality of weights of a given kernel corresponding to a layer of a neural network comprising a plurality of layers, each of the plurality of weights comprising a signed value; and
a processing circuit coupled to the memory, wherein the processing circuit is configured to:
retrieve, from the memory, the plurality of weights of the given kernel; and
generate a classification of an input dataset with the neural network, wherein to generate the classification, the processing circuit is configured to:
negate each weight of the plurality of weights, responsive to a maximum weight of the plurality of weights of the given kernel being greater than an absolute value of a minimum weight of the plurality of weights of the given kernel;
quantize the negated weights to generate quantized versions of the plurality of weights; and
execute, using the generated quantized versions of the plurality of weights, the layer of the neural network to generate an output based on the input dataset.

16. The apparatus as recited in claim 15, wherein the processing circuit is further configured to perform one-sided clipping of the plurality of weights prior to negating the plurality of weights, and wherein quantizing negated weights comprises rounding to a nearest quantization level of a reduced precision data format.

17. The apparatus as recited in claim 16, wherein performing one-sided clipping of the plurality of weights comprises:
calculating a scale threshold based on the maximum weight and the absolute value of a minimum weight of the given kernel; and
scaling each weight of the plurality of weights using the scale threshold.

18. The apparatus as recited in claim 17, wherein calculating the scale threshold comprises:
multiplying a tunable parameter by the maximum weight to generate a first product;
subtracting the tunable parameter from one to generate a difference value;
multiplying the difference value by the absolute value of the minimum weight to generate a second product; and
adding the first product to the second product.

19. The apparatus as recited in claim 17, wherein each weight is multiplied by a maximum positive value of a range of the reduced precision data format, and wherein each weight is divided by the scale threshold.

20. The apparatus as recited in claim 17, wherein responsive to the maximum weight being less than the absolute value of the minimum weight, the quantized versions of the plurality of weights are based on non-negated versions of the plurality of weights.

* * * * *